(12) United States Patent
Fidan et al.

(10) Patent No.: US 8,689,456 B2
(45) Date of Patent: Apr. 8, 2014

(54) FOLDING RULE HAVING A LIGHTING ELEMENT

(76) Inventors: Cetin Fidan, Bischberg (DE); Okan Ciftci, Stegaurach (DE)

( * ) Notice: Subject to any disclaimer, the term of this patent is extended or adjusted under 35 U.S.C. 154(b) by 105 days.

(21) Appl. No.: 13/148,436

(22) PCT Filed: Feb. 8, 2010

(86) PCT No.: PCT/EP2010/000771
§ 371 (c)(1),
(2), (4) Date: Nov. 2, 2011

(87) PCT Pub. No.: WO2010/089148
PCT Pub. Date: Aug. 12, 2010

(65) Prior Publication Data
US 2012/0036726 A1    Feb. 16, 2012

(30) Foreign Application Priority Data

Feb. 9, 2009  (DE) .................... 20 2009 001 592 U
Apr. 16, 2009  (DE) ........................ 10 2009 017 655

(51) Int. Cl.
*G01B 3/06*    (2006.01)
*B43L 7/10*    (2006.01)

(52) U.S. Cl.
USPC .............................................. 33/458; 33/492

(58) Field of Classification Search
USPC ........... 33/484, 456, 458, 459, 483, 485, 492, 33/478, 348, 451
See application file for complete search history.

(56) References Cited

U.S. PATENT DOCUMENTS

| 2,563,191 | A | * | 8/1951 | Russ | 250/462.1 |
| 2,939,947 | A | * | 6/1960 | Schultz | 33/348.2 |
| 4,075,467 | A | * | 2/1978 | Peterson | 362/602 |
| 4,158,229 | A | * | 6/1979 | Woo et al. | 702/161 |
| 4,233,741 | A | * | 11/1980 | Bisset | 33/1 N |
| 4,426,790 | A | * | 1/1984 | Kimel | 33/458 |
| 4,580,347 | A | * | 4/1986 | McKnight | 33/760 |
| 4,665,623 | A | * | 5/1987 | Wright | 33/468 |
| 5,580,239 | A | | 12/1996 | Jang | |
| 5,675,901 | A | * | 10/1997 | Young | 33/451 |
| 6,243,958 | B1 | * | 6/2001 | Ringley, Jr. | 33/474 |
| 6,415,521 | B1 | * | 7/2002 | Schnell | 33/511 |
| 6,765,155 | B1 | * | 7/2004 | Gray | 177/148 |
| 7,111,408 | B2 | * | 9/2006 | Critelli et al. | 33/458 |
| 7,134,214 | B1 | * | 11/2006 | Manning | 33/483 |
| 7,637,024 | B2 | * | 12/2009 | Amundson et al. | 33/355 R |
| 7,900,366 | B2 | * | 3/2011 | Spaulding | 33/348.2 |
| 2002/0148127 | A1 | * | 10/2002 | Dana et al. | 33/456 |
| 2009/0064517 | A1 | * | 3/2009 | Sanderson | 33/494 |
| 2010/0325909 | A1 | * | 12/2010 | Fratti et al. | 33/707 |

FOREIGN PATENT DOCUMENTS

| CN | 201102412 Y | 8/2008 |
| CN | 201211792 Y | 3/2009 |
| DE | 1 965 969 | 8/1967 |
| DE | 202 16 868 U1 | 4/2003 |
| DE | 20 2006 015 653 U1 | 1/2007 |
| DE | 20 2007 006 460 U1 | 8/2007 |

OTHER PUBLICATIONS

International Search Report including English language translation dated Apr. 9, 2010 (Four (4) pages).
PCT/ISA/237 Form (Five (5) pages), Apr. 12, 2010.
Chinese Office Action dated Oct. 21, 2013 with English translation including Search Report (twenty-one (21) pages).

* cited by examiner

*Primary Examiner* — Christopher Fulton
(74) *Attorney, Agent, or Firm* — Crowell & Moring LLP

(57) ABSTRACT

An inch rule for reading off distances has at least one lighting element that is adapted to lights up the surroundings.

10 Claims, 14 Drawing Sheets

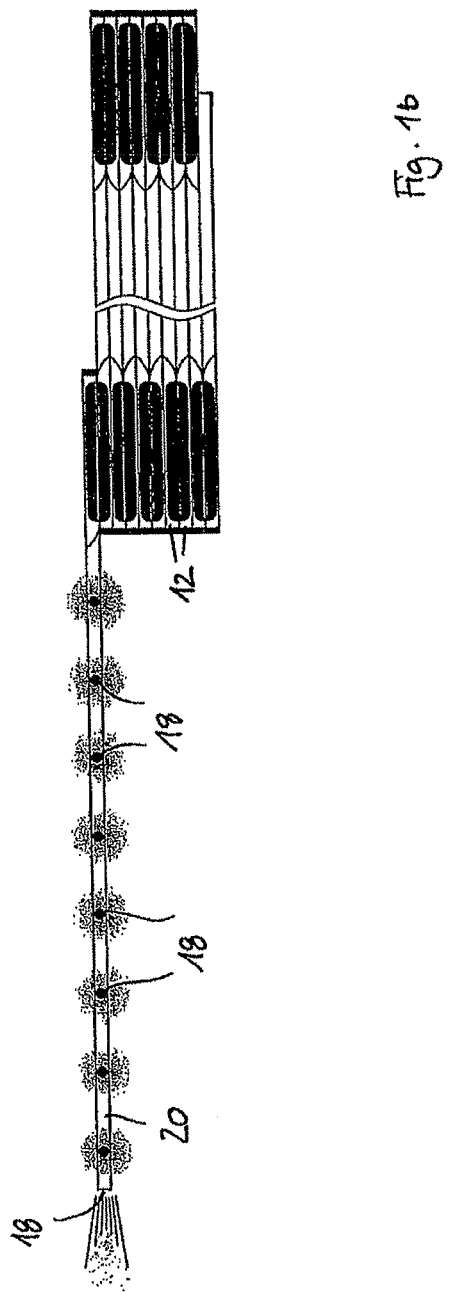

FOLDING RULE HAVING A LIGHTING ELEMENT

BACKGROUND AND SUMMARY OF THE INVENTION

Figure 1A:
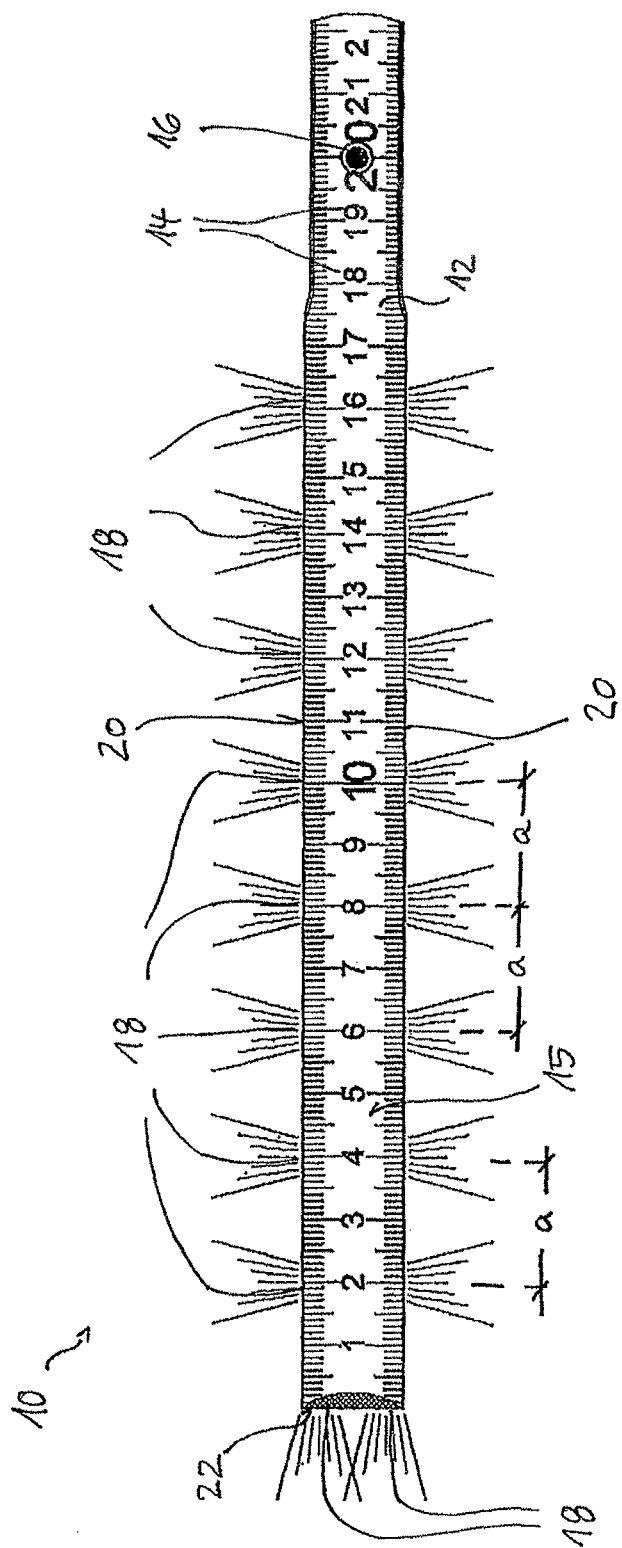

The invention concerns an inch rule for reading off distances.

Inch rules are also known as yardsticks or measuring rods and are used inter alia in building construction to ascertain distances of construction parts or to mark distances on surfaces.

Known inch rules suffer from the disadvantage that they cannot be used in twilight, at night or in a dark area.

German patent document DE 20 2007 006 460 U1 discloses a measuring device which can be used even at twilight, at night or in a dark area. In particular that publication discloses a measuring tape which is accommodated in a housing. A lighting device is incorporated into the housing, the lighting device shining laterally on the measuring tape and thus making it possible to use it even at twilight or at night.

Measuring tapes, however, suffer from the disadvantage that when measuring the distance between two construction parts the tapes possibly sag or 'kink', which falsifies the measurement result.

Exemplary embodiments of the present invention an inch rule that makes it possible to perform measurements even under unfavorable lighting conditions.

For that purpose the invention provides an inch rule for reading off distances, wherein there is provided at least one lighting element, wherein the lighting element is so adapted that it lights up the surrounding of the inch rule. The light density and the radiating surface of the lighting element are correspondingly adapted. That inch rule makes it possible to perform measurements even under unfavorable lighting conditions, that is to say in twilight, at night or in a dark region. An advantage with the inch rule is that it is more stable and more rigid than the measuring tape known from the state of the art. Precise measurements are thus possible. The inch rule according to the invention therefore has two functions, namely lighting at least the closer surroundings and measuring distances.

Preferably the at least one lighting element is integrated in the inch rule, that is to say the lighting element is part of the inch rule, wherein, as lateral boundaries of one or more foldable members of the inch rule (preferably the beginning and the end members), light strips can be integrated or mounted throughout at one or both sides of the respective members. Lighting elements with a lighting direction parallel to the inch rule can also be so disposed at the beginning and/or end member of the inch rule that the lighting elements completely mask out the writing on the inch rule.

The at least one lighting element can be battery-operated or solar power-operated. In that respect, the batteries can be rechargeable, in which respect it is conceivable that the entire inch rule is fitted into a charging station. A solar power-operated lighting element is advantageous as it does not require any batteries. Such solar cells are known for example in the case of solar power-operated pocket calculators and take up little space. It is also conceivable that the dimensions of a member of the inch rule are such that it can accommodate a battery, in particular a battery of size AAA.

In particular there is provided a switch device by means of which the at least one lighting element can be switched on and/or off. Thus the lighting element can be switched on or off as required by means of the switch device.

In an embodiment the switch device can be a sliding switch, a pushbutton switch, an electrically controlled switch or a press switch.

The switch or the selected switching device can assume a position that causes the lighting element to flash. The inch rule can therefore also be used as a warning element. The flashing inch rule can be fixed for example to a projecting component to warn others of the obstacle.

The switching device can also assume a position that switches one or more lighting elements on or off or dims the lighting elements. A step switch can also be provided.

A magnetic switch can be provided and the inch rule can be so designed that the at least one lighting element is switched on or off when unfolded.

The inch rule can be designed with one or more foldable members. Preferably the inch rule is a folding inch rule with a plurality of members. The individual members are for example riveted together so that the inch rule can be folded together.

The members or individual members can also be releasably connected together by means of connecting elements, and therefore individual members can be replaced. Press knobs or screws can be used for the releasable connection.

In an embodiment a plurality of lighting elements can be arranged distributed uniformly over the inch rule member. Equally the lighting elements can be arranged distributed irregularly over the member.

The at least one lighting element is preferably partially or entirely embedded in the material of a member.

The material of the member can be transmissive for the light emitted by the at least one lighting element, at least at the position of the at least one lighting element or entirely.

Such lighting elements can also light a rear side of a corporate logo which is left transparent in the uppermost member of the folding inch rule.

The inch rule can be of a length of 0.5 m, 1 m, 2 m, 3 m, 4 m, 5 m etc.

A member of the rule can be magnetic so that it can be caused to adhere to a required location and can rotate in any desired position. The rule is then rotatable through 360°.

A digital clock with an alarm and/or reminder function can be used.

It is also conceivable for the at least one lighting element to be embedded in a flexible sock-like plastic portion. The sock-like plastic portion can then be fitted over the rule. In that way the rule can be retro-fitted with at least one lighting element.

BRIEF DESCRIPTION OF THE DRAWING FIGURES

Figure 2:
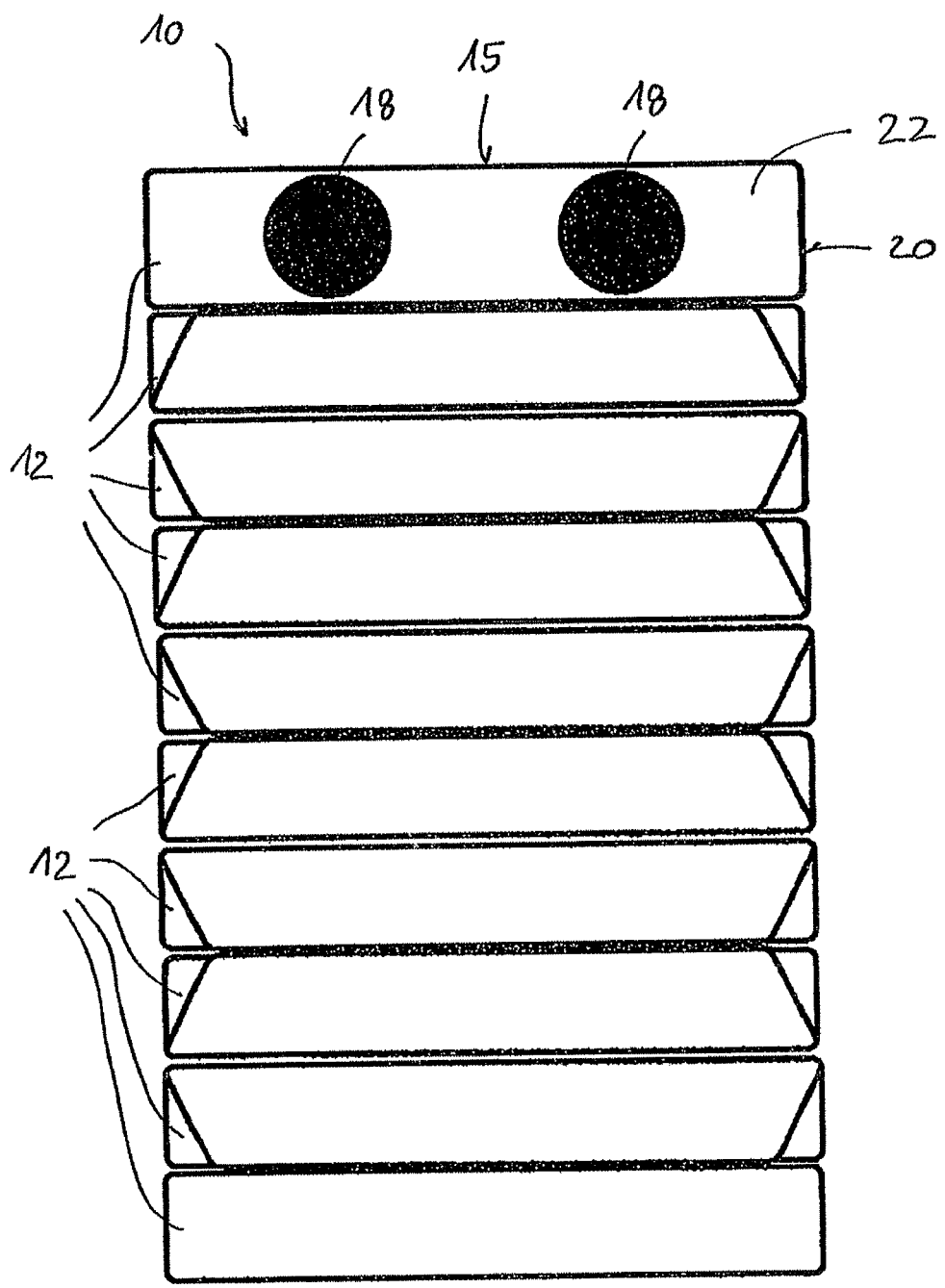
Figure 3:
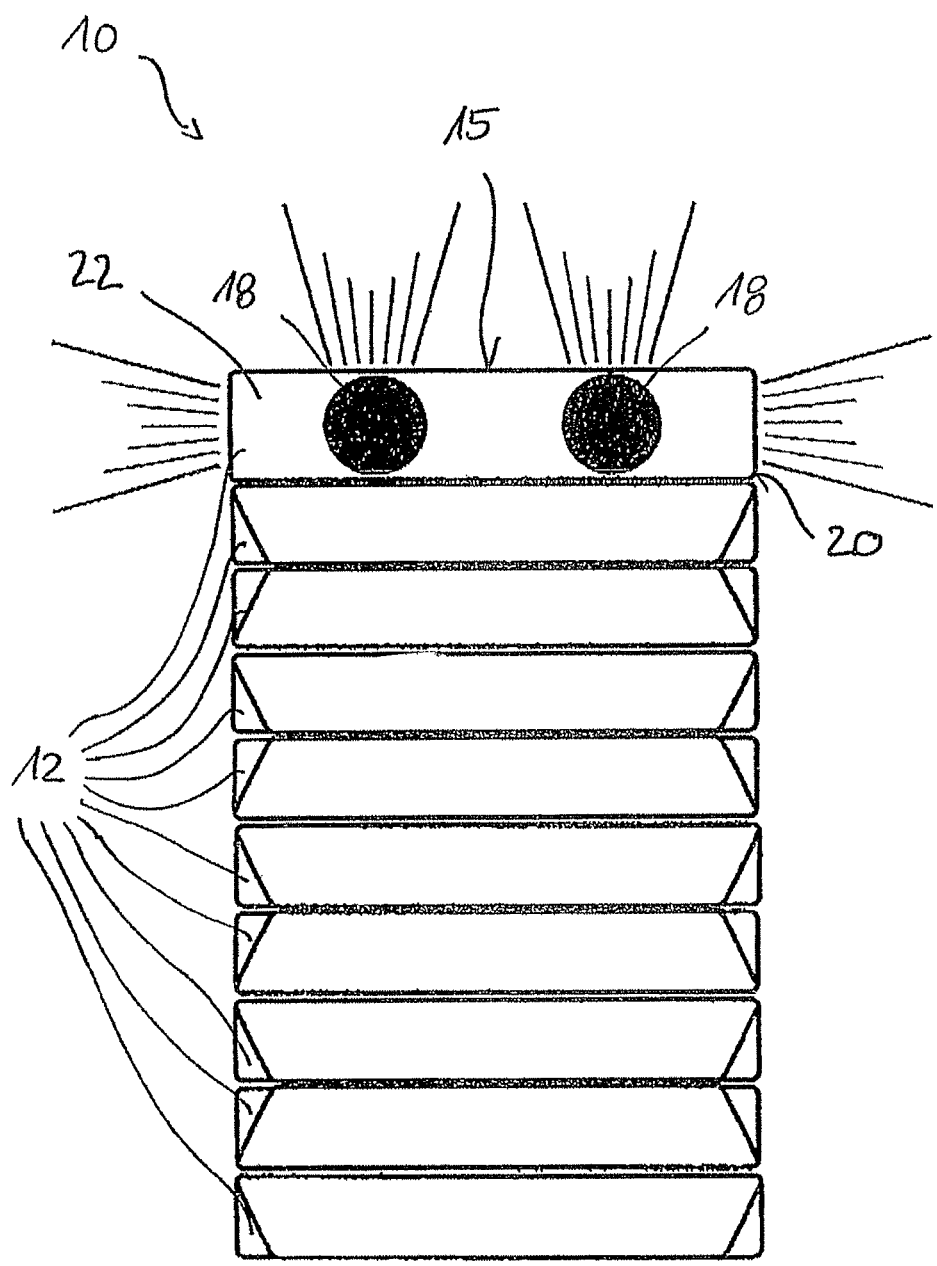
Figure 4:
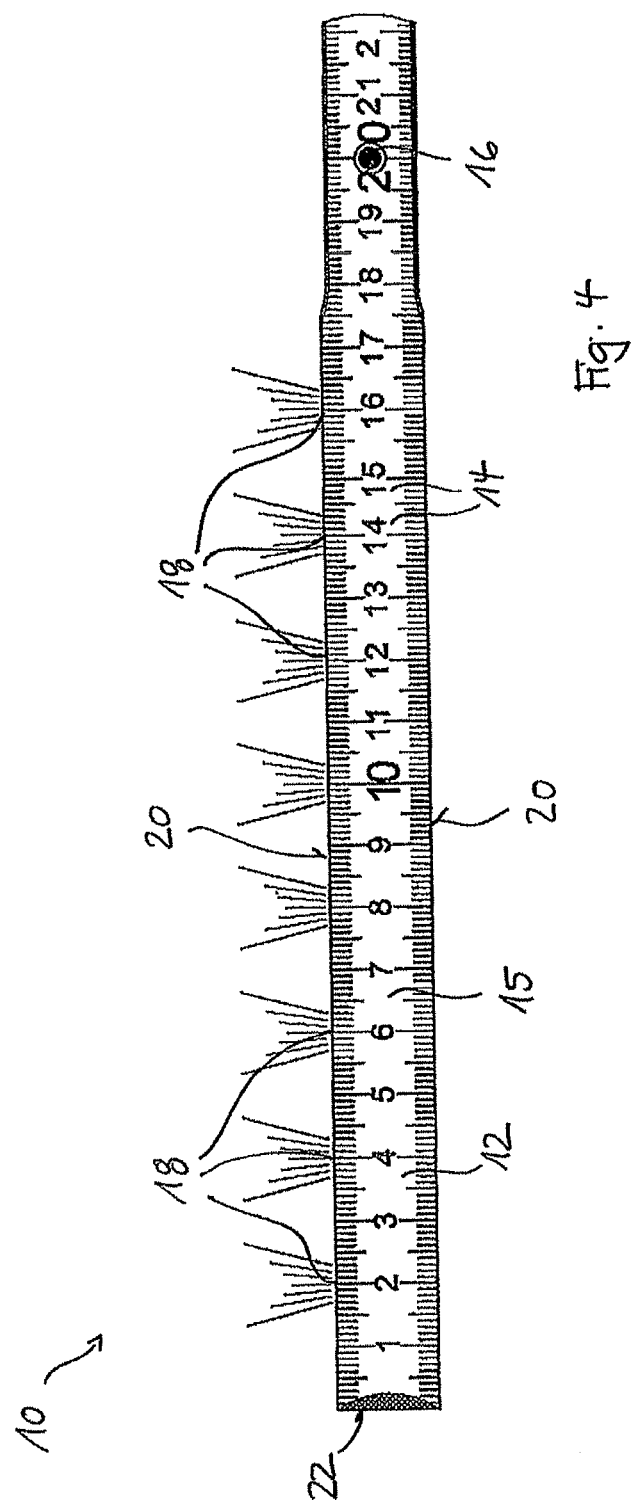
Figure 5:
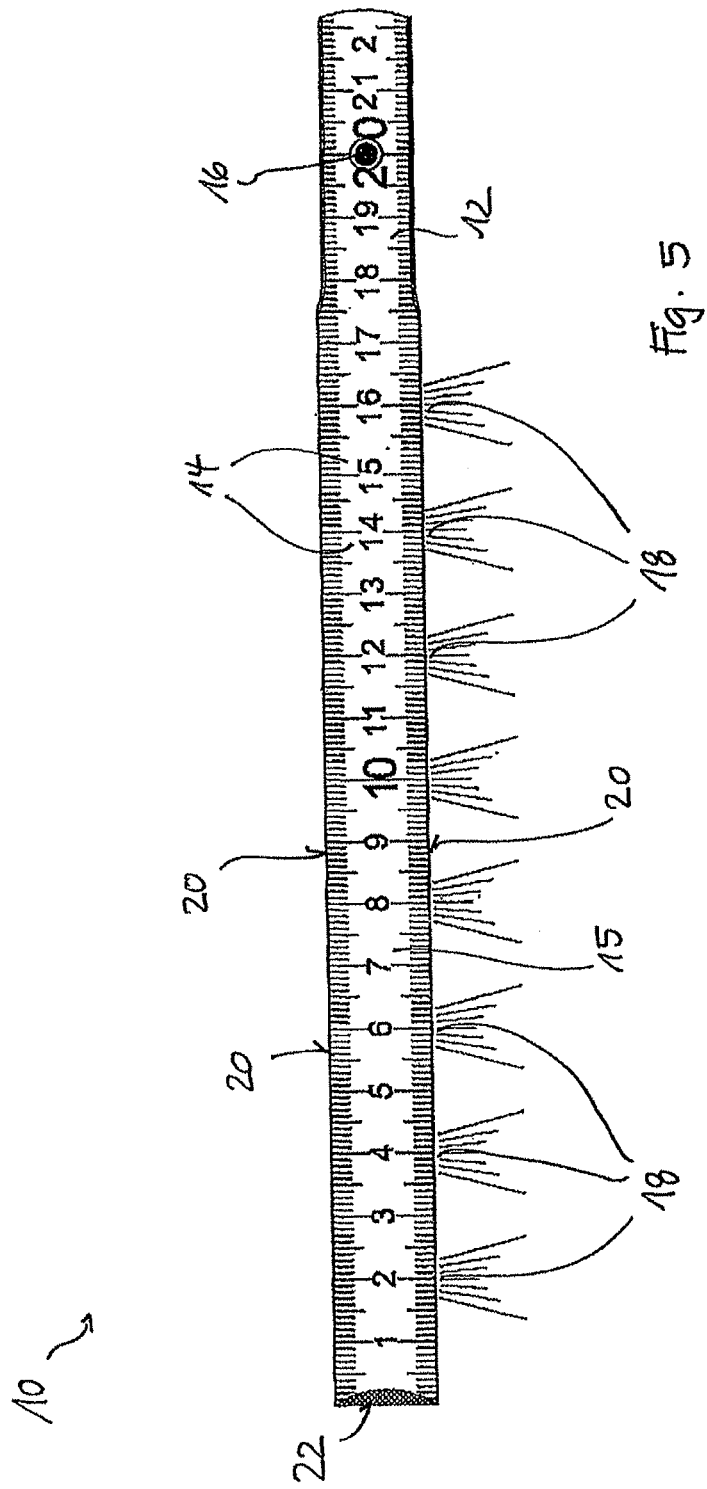
Figure 6:
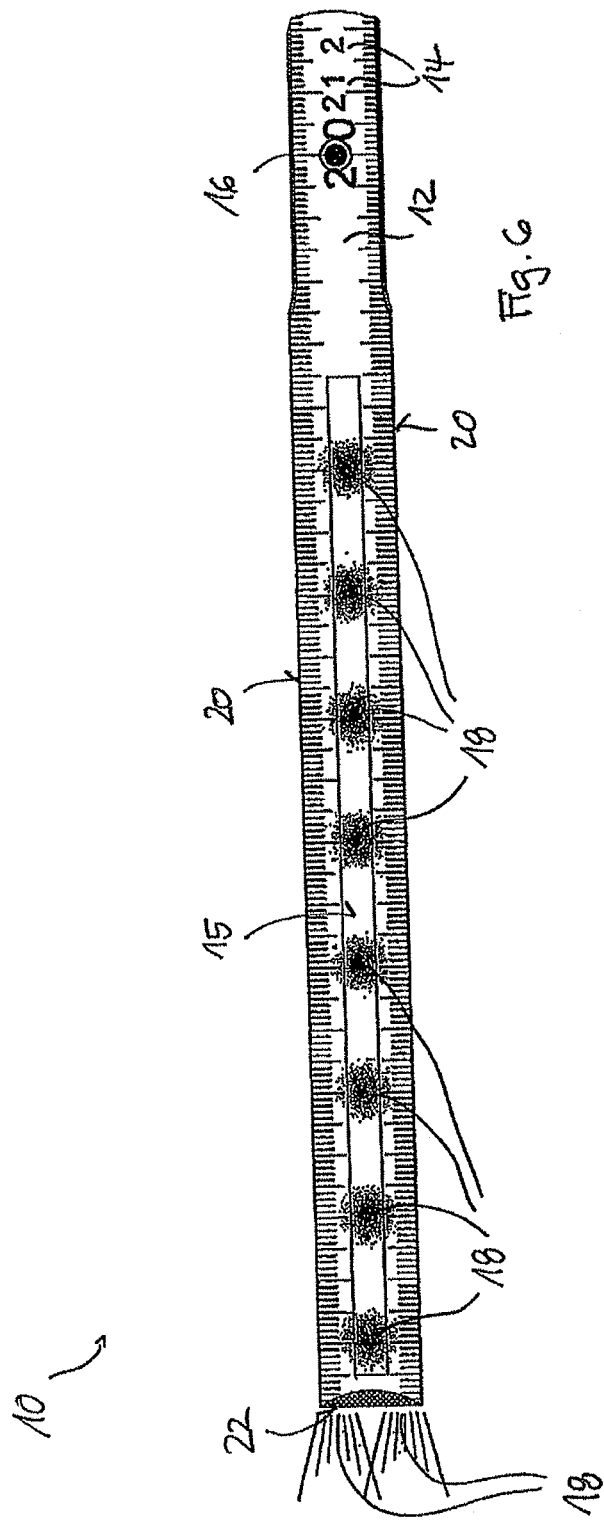
Figure 7:
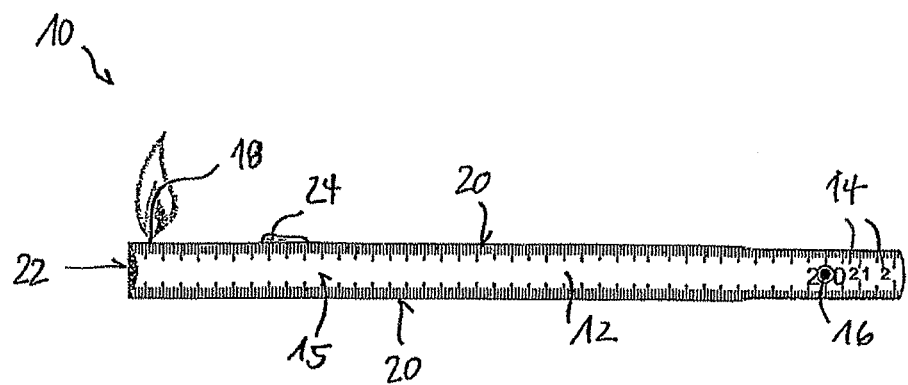
Figure 8:
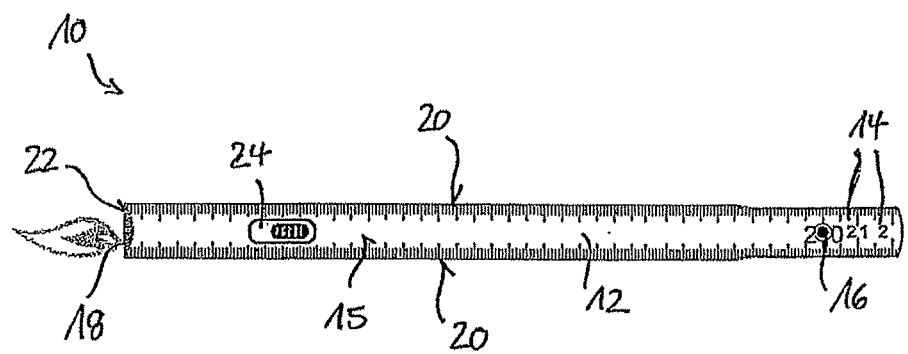
Figure 9:
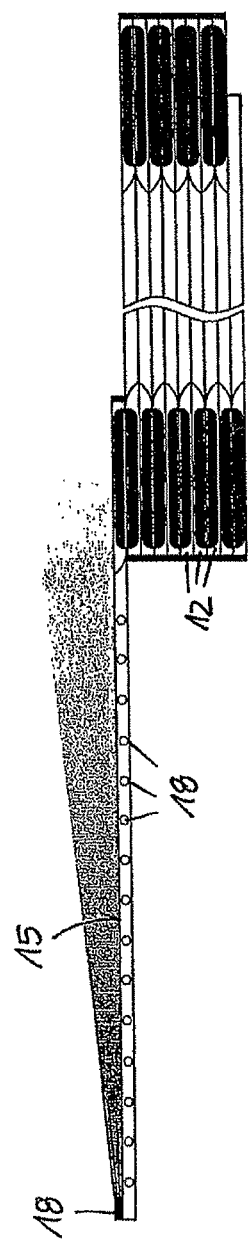
Figure 10:
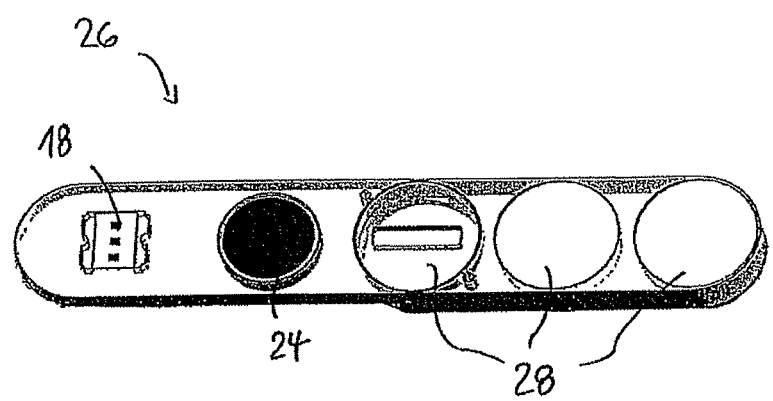
Figure 11:
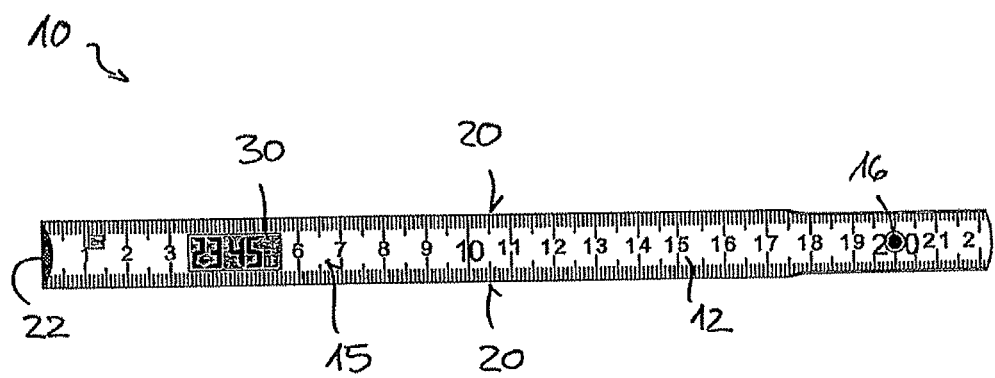
Figure 12:
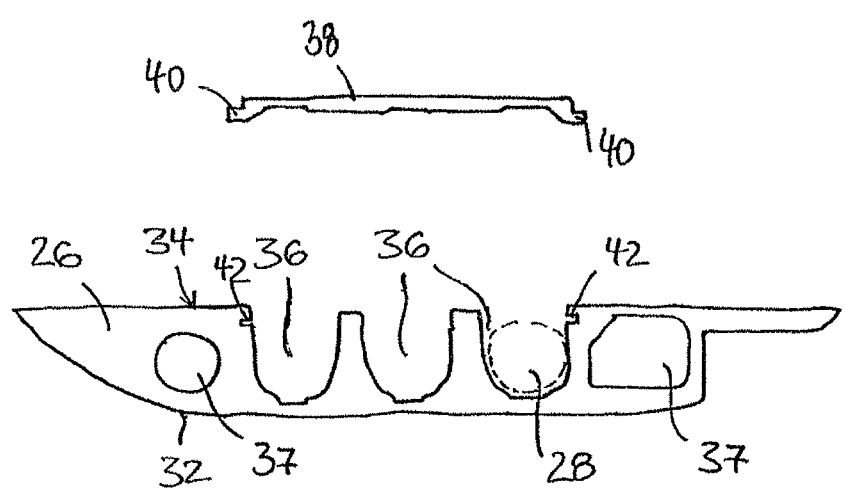
Figure 13:
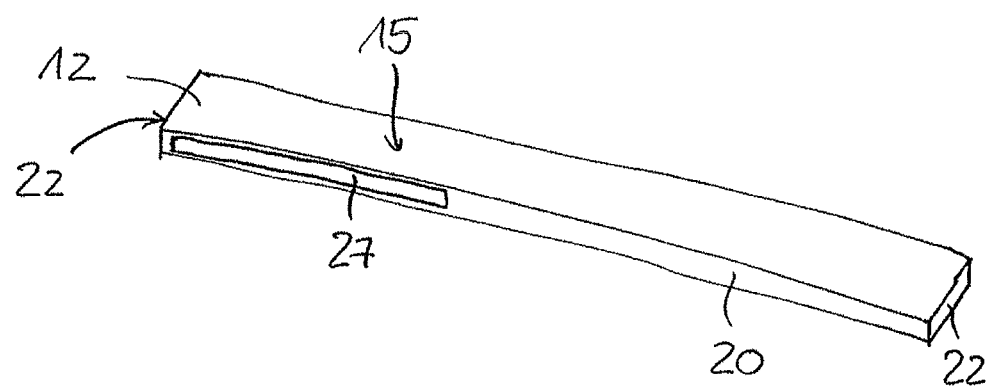
Figure 14:
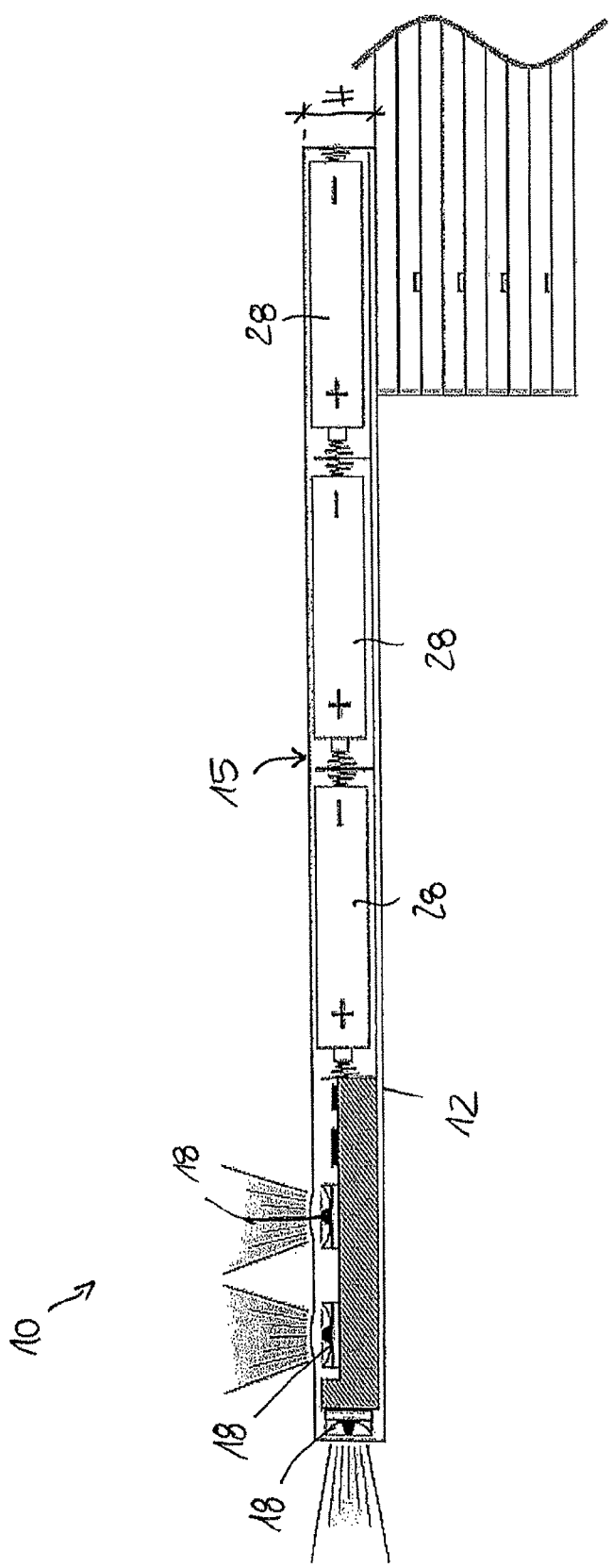

Further features and advantages of the invention will be apparent from the description hereinafter and the drawings. The invention is described by means of various embodiments. In the drawings:

FIG. 1a shows a plan view of an inch rule according to the invention in a first embodiment with lighting elements in the switched-on condition, FIG. 1b shows a side of the inch rule shown in FIG. 1a, FIG. 2 shows a front view of the inch rule shown in FIG. 1 with lighting elements switched off, FIG. 3 shows a front view corresponding to FIG. 2 with the lighting elements switched on, FIG. 4 shows a plan view of an inch rule according to the invention in a second embodiment with laterally mounted lighting elements in the switched-on condition, FIG. 5 shows a view corresponding to FIG. 4 of an inch rule according to the invention in a further embodiment with laterally mounted lighting elements in the switched-on condition, FIG. 6 shows a view corresponding to FIG. 4 of an inch rule according to the invention in a further embodiment with lighting elements in the switched-on condition, FIG. 7 shows a view corresponding to FIG. 4 of an inch rule according to the invention in a further embodiment with a switched-on lighting element, FIG. 8 shows a view corresponding to FIG. 4 of an inch rule according to the invention in a further embodiment with a switched-on lighting element, FIG. 9 shows a side view of an inch rule according to the invention in a further embodiment with a switched-on lighting element, FIG. 10 shows a view of an electronic component having a lighting element, FIG. 11 shows a view corresponding to FIG. 1a of an inch rule in a further embodiment with lighting elements switched off, FIG. 12 shows a view of an electronic component having a lighting element, FIG. 13 shows a side view of the inch rule having a recess, and FIG. 14 shows a side view of an inch rule according to the invention in a further embodiment.

DETAILED DESCRIPTION

FIGS. 1 through 3 show an inch rule 10 according to a first embodiment. The inch rule 10 serves for reading off distances and is also known as a measuring rod or yardstick. The inch rule 10 can preferably be a folding rule having a plurality of members 12 which are connected together. The side view (FIGS. 1b, 2 and 3) shows ten members 12. It is also possible to provide more or fewer than ten members. Each member has a measuring scale 14 so that the length of a component or the distance between two components can be read off on the measuring scale 14, with the rule 10. FIG. 1 shows the measuring scale 14 on the top side 15 of the member 12.

FIG. 1 shows a rivet 16 with which the members 12 are connected together. Equally the members 12 could be releasably connected together by means of screws or press knobs (not shown). That makes it possible to replace individual members.

The member 12 which is the uppermost one in FIG. 1a has a plurality of lighting elements 18 that make it possible to take measurements even under unfavorable lighting conditions, that is to say at night, in twilight or in a dark region. There are a plurality of lighting elements 18 (eight are shown in each case) at the two longer sides 20 (long sides) of the uppermost member 12 and two lighting elements 18 are provided at an end 22 of the uppermost member 12.

The individual lighting elements 18 at the long sides 20 of the member 12 are respectively arranged at a spacing apart from each other, that is to say the lighting elements 18 are arranged uniformly distributed. Equally the lighting elements could be arranged irregularly distributed (not shown). FIG. 2 shows the lighting elements 18 in the switched-off condition whereas FIGS. 1 and 3 shown them in the switched-on condition.

The lighting elements 18 are integrated into the member 12 of the yardstick 10, that is to say they are fitted into provided recesses (not shown). Equally the lighting elements 18 could be mounted to the uppermost member 12 or to one or more other members 12. The lighting elements can also be embedded in the material of the member 12. The material of the member 12 can then be transmissive for the light emitted by the at least one lighting element 18, at least at the position of the lighting element 18 or also completely. The lighting elements 18 are of a low structure and are embedded flush so that the inch rule 10 is not limited in its functionality (folding up, measuring and so forth).

The lighting elements 18 can be battery-operated or solar power-operated, wherein a button cell can be used as the battery. It is also possible to use rechargeable batteries. Furthermore the lighting elements 18 can be switched on and off by means of a switching device (not shown). In addition it is possible for the lighting elements 18 to flash when the switching device (not shown) which is for example a sliding switch, a pushbutton switch, an electrically controlled switch or a press switch, assumes a 'flashing position'. If a sliding switch is used then, in a further position of the switch, only the lighting elements 18 arranged at the long side 20 of the yardstick 10, that is the upper long side in FIG. 1, are switched on, while in a further position only the lighting elements 18 arranged at the long side 20 of the yardstick 10, that is the lower long side in FIG. 1, are switched on, in a further position only the lighting elements 18 arranged at the end 22 are switched on and in a further position all lighting elements 18 are switched on at the same time. The lighting elements 18 are for example light emitting diodes, in which respect white light emitting diodes or light emitting diodes of another color can be used.

Equally, further lighting elements could be provided at the underside of the member 12 that is the lowest one in FIG. 2, wherein those further lighting elements could light up the region beneath the inch rule 10.

The embodiment shown in FIG. 4 differs from the first embodiment only in that the lighting elements 18 are only provided along one of the long sides 20, namely along the upper long side 20 in FIG. 1.

The FIG. 5 embodiment differs from the FIG. 4 embodiment only in that the lighting elements 18 are arranged only along the lower long side 20 in FIG. 5.

The FIG. 6 embodiment differs from the FIG. 1 embodiment only in that the lighting elements 18 are arranged at the end 22, that is to say the transverse side, and the top side 15 of the uppermost member 12.

The embodiments shown in FIGS. 7 and 8 differ from the previously illustrated embodiments in that the lighting element 18 is a flame. The flame is ignited by means of a switch 24. The principle corresponds to that of a lighter. By way of example a roofer can light a welding torch by means of such a flame.

FIG. 7 shows the lighting element in the form of a flame at the long side 20 of the uppermost member 12 of the inch rule 10 and the embodiment in FIG. 8 shows the lighting element in the form of a flame at the end 22.

The FIG. 9 embodiment differs from the embodiment shown in FIGS. 1 through 3 in that a lighting element 18 is arranged at the top side 15 of the inch rule 10, more specifically in such a way that it lights the measuring scale 14 on the top side 15.

FIG. 10 shows an electronic component 26 having a lighting element 18, a switch device 24 and three batteries 28 which are replaceable. The illustrated electronic component 26 can be fitted into a recess in the inch rule 10, that is to say the electronic component 26 can be produced separately from the inch rule 10. The electronic component 26 can thus also be retro-fitted to an inch rule 10.

FIG. 11 shows a further embodiment of the inch rule 10. It differs from the above-described embodiments in that there is a clock 30. The clock 30 can have an alarm and/or reminder function. The clock 30 can be integrated in the inch rule, embedded in a suitable recess (not shown) and/or fixed to the inch rule 10 by means of a suitable process (for example gluing). The clock 30 is provided at the top side 15 of the inch rule 10. One or more lighting elements 18 can be arranged at the long sides 20 of the member 12 and/or at the end 22 of the member 12.

FIG. 12 shows an electronic component 26 which can be mounted to the inch rule 10 alternatively to the electronic component shown in FIG. 10. In particular the plastic component can be fitted into a recess provided at the long side 20 or the end 22 of the uppermost member of the inch rule 10. FIG. 13 shows the uppermost member 12 of an inch rule 10 having a recess 27 in the long side 20.

The recess is either subsequently milled out of the member of the inch rule 10, or such a recess can already be provided by suitable tools upon manufacture of the inch rule member, in particular injection molding thereof. It is also conceivable for the member of the inch rule 10 to be in two parts, wherein the component is to be fitted into the upper or lower part of the member and then the upper and lower parts are to be connected together along a connecting seam, the connecting seam extending along the long sides 20 and the ends 22.

The component 26 has a curved edge 32 and an oppositely disposed, substantially straight edge 34, wherein the straight edge 34, when the electronic component is fitted into the recess in the inch rule 10, forms a part of the long side of the inch rule 10. The straight edge 34 is interrupted by three recesses 36, wherein each recess 36 can accommodate a battery 28. FIG. 12 shows an accommodated battery 28. The component further has two cavities 37 which can accommodate a switch device and/or a lighting element.

There is provided a bar 38 having two projections 40. The projections 40 of the bar 38 can project into corresponding recesses 42 in the component and in so doing cover over the recesses 36 so that the long side 20 of the inch rule 10 is substantially flat.

The component 26 is fixed to the inch rule 10, in particular, by means of laser welding. In particular, the laser welding operation is effected not from the top side of the inch rule but from the long side thereof. To permit and enhance penetration of the laser beams thereinto, the component 26 is in particular transparent. In addition reflection means can be provided to deflect the laser beam as desired. No additional material such as wire and so forth is used in the laser beam welding operation; rather, plastic materials which form a melt, that is to say thermoplastic materials, are used. As the component is transparent, the laser beam passes almost unimpeded therethrough. The component itself scarcely heats up, by virtue of its transparency. The inch rule in contrast absorbs the radiation, begins to melt and in so doing transmits the heat generated to the component by thermal conduction. After the component is fixed in the recess the batteries 28 are fitted into the recesses 36 and the recesses 36 are closed by the bar 38 so that a flat long side 20 is formed.

The laser welding operation can also be effected from the top side of the inch rule if the measuring scale is only subsequently fitted to the inch rule member.

Alternatively the component 26 can also be fitted to the inch rule by means of an adhesive. It is also conceivable for the component 26 to be fixed to the inch rule 10 by means of ultrasonic welding.

FIG. 14 shows an inch rule 10 whose uppermost member 12 accommodates three batteries 28 of size AAA. The uppermost member 12 of the inch rule 10 is therefore of a height H which differs from the height of the remaining members 12. The batteries 28 can either be fitted laterally in the uppermost member. Equally the batteries 28 can be inserted from the top side 15 of the uppermost member 12.

The invention claimed is:

1. A foldable inch rule, comprising:
    a plurality of foldable members;
    at least one lighting element attached at an end member of said plurality of foldable members;
    said end member has an end, a measurement scale on an upper side and a long side;
    said at least one lighting element is arranged to light up surroundings of the inch rule, and
    one electronic component that includes said at least one lighting element and a switch device is arranged in a recess in the long side or in the end of said end member.

2. The inch rule as set forth in claim 1, wherein the at least one lighting element is integrated in the inch rule.

3. The inch rule as set forth in claim 1, wherein the at least one lighting element is battery-operated or solar power-operated.

4. The inch rule as set forth in claim 1, further comprising:
    a switch device arranged to switch the at least one lighting element on or off.

5. The inch rule as set forth in claim 4, wherein the switch device is a sliding switch, a pushbutton switch, an electrically controlled switch or a press switch.

6. The inch rule as set forth in claim 4, wherein the switch device includes a position causing the lighting element to flash.

7. The inch rule as set forth in claim 1, wherein the plurality of foldable members are releasably connected together by connecting elements.

8. The inch rule as set forth in claim 1, wherein a plurality of lighting elements are distributed uniformly over said end member.

9. The inch rule as set forth in claim 1, wherein the at least one lighting element is embedded into the material of one of the plurality of foldable member said end member.

10. The inch rule as set forth in claim 1, wherein a material of the plurality of foldable members is transmissive for the light emitted by the at least one lighting element at least at a location of the at least one lighting element.

* * * * *